Aug. 5, 1952 — G. N. SCOTT — 2,605,786
DEVICE FOR PREVENTING INJURY TO PIPE COATINGS
Filed Oct. 27, 1947
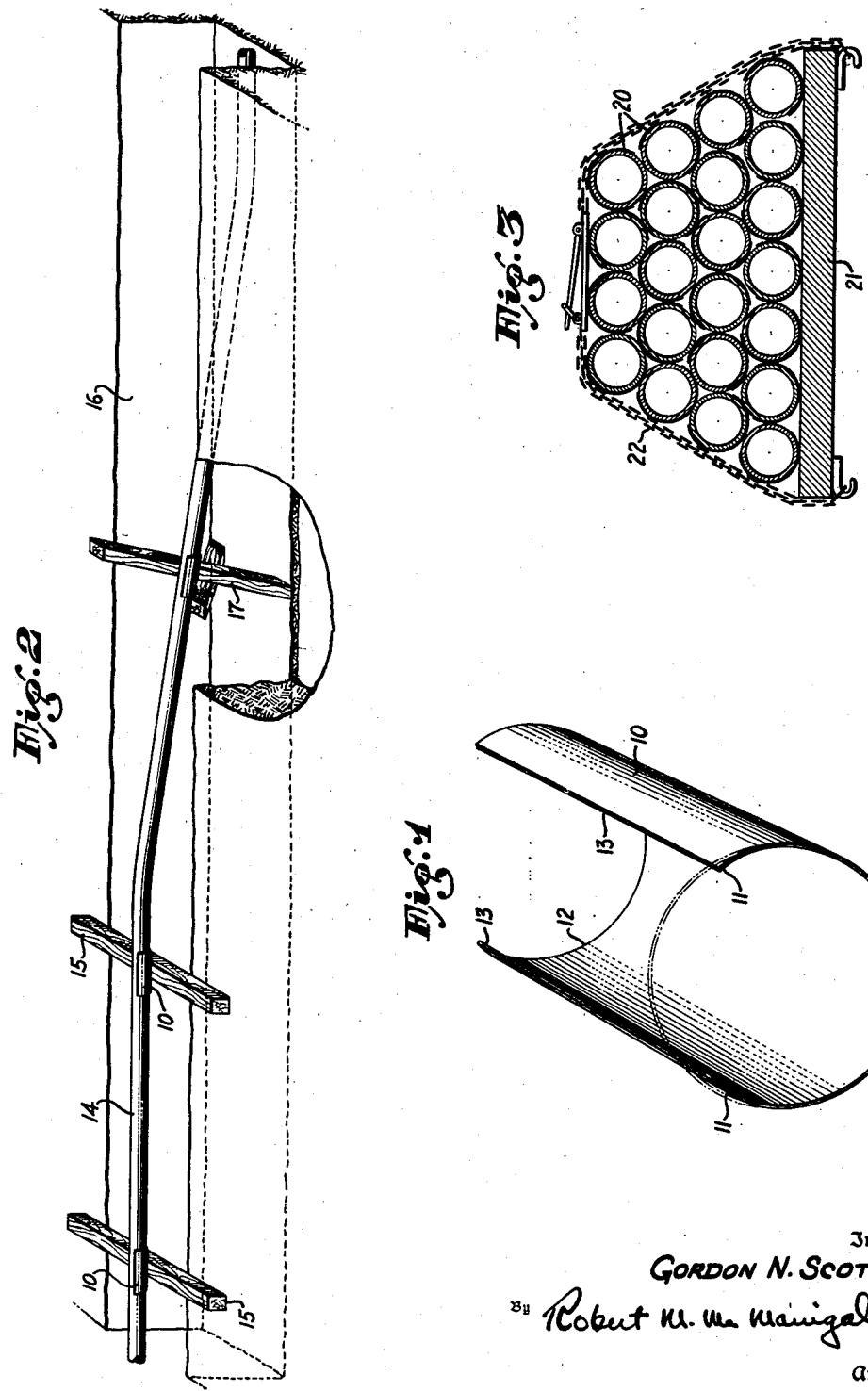
Inventor
GORDON N. SCOTT.
By Robert M. McManigal
Attorney Patented Aug. 5, 1952

2,605,786

UNITED STATES PATENT OFFICE 2,605,786

DEVICE FOR PREVENTING INJURY TO PIPE COATINGS

Gordon N. Scott, Beverly Hills, Calif.

Application October 27, 1947, Serial No. 782,338

1 Claim. (Cl. 138—61)

This invention relates to a device for preventing injury to bituminous pipe coatings during handling and transportation of the coated pipes and the construction of pipe lines whether the coating be applied at a central plant or in the field in an over-the-trench operation.

At the central plant where the pipe is cleaned and coated, it may be stockpiled or at once loaded on trucks, transported to the field and strung along the right-of-way where it is welded together and placed on skids preparatory to cleaning and coating the welded joints after which the pipe is lowered into the trench and the trench back filled.

In the over-the-trench coating operation, the pipe is made up and placed on skids which span the trench. This operation is followed by usually two travelling type machines which clean, prime and coat the pipeline which is then either laid directly in the prepared trench or upon the skids which span the trench. In the latter step, opportunity is afforded to inspect and to repair the coating before the pipe is lowered.

In the various steps in these several operations the coating may be abraded and require patching before the lowering is done which slows and adds to the cost of construction.

Factory coated pipe for transportation is often nested on a flat-bed truck or, particularly in the longer lengths, laid on bolsters on companion truck and trailer and the loaded pipe securely held to the bolsters by chains. While a set of the uncoated ends of pipe can be placed on the truck bolster and the chains cinched over the bare pipe, for safety and balance the trailer bolster is usually a distance from the truck bolster considerably less than average length of the coated pipes so that the bolster contacts the coating at the lower tier of pipes, while the cinch chain contacts the coating on the upper tier. Notwithstanding the customary padding of bolsters and bolster chains, the coating is often abraded at such points of contacts, especially when the haul is long or rough.

The pipe lengths are welded together in the field and placed on 4-inch by 6-inch skids placed across the pipe trench and usually so located between the welded joints to minimize stresses on the welds. The made up pipe on skids, which may be one or more miles in length, expands and contracts with changes in temperature between day and night and in extreme cases may wander completely off the skids to the disadvantage of the coating.

Pairs of skids are also employed in a formation to support the pipeline where the portion laid emerges from the back-filled trench and so extends to the skidded over-the-trench position. At all such skidded points the coating is susceptible to damage notwithstanding ordinary efforts to pad the skids.

In the field application of coatings on made up pipe, one practice is to so govern the coating operation as to be assured of perfection in the coating so that the lifted pipe is lowered directly into the trench behind the coating machine. Another practice is to return the elevated pipe after coating to skids for inspection and repair before lowering. Owing to the general unsatisfactory results of padding, some operators completely ignore padding and patch the resulting coating damage prior to laying along with the general repair work which is done by a crew just ahead of the lowering-in gang.

Padding at bolsters and chains is accomplished by use of scrap rubber or other similar materials appropriately placed. For padding skids burlap sacks filled with straw or sand are in prevalent use, but this type of padding has many disadvantages. Weathered sacks or sacks of poor quality readily rupture and spill their contents and become of little or no value. Furthermore, frictional forces involved are such as to cause the pipe, moving laterally on expansion, to carry with it padding and skid so that on later contraction, a length of pipe falls with damage to the coating into the trench.

The present invention provides a guard of wide applicability for preventing injury to the coating in stockpiling, in transportation and in skidding over-the-trench pipelines.

The guard of my invention is essentially a short incomplete or open tubular section formed from spring steel or other material having suitable rigidity and flexibility to a radius equal to or slightly less than the outside radius of the coated pipe and encompassing at least one-half, and preferably two-thirds, of the circumference of the coated pipe which it is adapted to protect.

The principal object of my invention is to provide a device to protect against damage during transportation, handling and the like to the coating applied to a pipe.

An important object of my invention is to provide a guard which in addition to preventing abrasion to the coating prevents the coating from becoming unduly thin at the area of contact with a skid by distributing the stresses uniformly and safely minimizing same.

Another object of my invention is to provide a guard which may be easily and rapidly applied to or removed from the pipe, permitting salvage or prompt change in location along the coated pipe.

Another object of my invention is to provide a guard which will stay on the coated pipe when the pipe is lifted by sling or end hooks or when the coated pipe is elevated for any reason during construction or before it is lowered to skids behind the over-the-trench coating operation.

Another object of my invention is to provide a guard having a smooth surface on the portion which is adapted to rest on the skid which permits the pipe, on lateral expansion movement, to slide along the skid without carrying the skid with it, thus saving otherwise possible large labor costs of repairing coating or trench destroyed by the pipe's movement.

Another object of my invention is to provide a guard having simplicity of design and flexibility which will permit nesting of the guards so that many units may be nested with great economy in space, may be thus shipped, handled or stored at minimum cost.

Another object of my invention is to provide a guard in which the ends and edges are chamfered to insure no indentation or other damage to the coating in the event of readjusting of the guard, about the coating due to any misalignment.

Another object of my invention is to provide a guard which is economical to construct. The low cost of the guard of my invention permits abandoning the guard in the ground, as, for example, in removing a lowering-in sling when the pipe is laid in the trench which often requires time to bell-hole under the pipe to free the sling pinned to the ground by the lowered pipe. Occasionally in pipe line construction, conditions are encountered where it is desirable to give more or less permanent mechanical reenforcement to the coating and in such cases guards may be used to advantage. Examples which will be recognized by those skilled in the arts of such uses are in forcing pipes through casing at road crossings and the like, at bored concrete walls or embankments, in particularly rocky areas where proper dressing of the trench bottom is impractical.

Another object of my invention is to provide a guard which is simple in design and which makes for minimum cost of fabrication, thus enhancing the savings possible in use in the variety of ways, many of which have herein been outlined, such as saving in labor and equipment for needless repair of the pipe coating.

My invention has many other objects, advantages, and features, some of which, with the foregoing, will be set forth in the following description, where I shall outline one form of my invention, which I have selected for illustration in the drawings accompanying and forming a part of the present specification.

Referring to the drawings:

Fig. 1 is a perspective view of the guard of my invention;

Fig. 2 is a schematic view of a section of earth showing a pipe line trench along which a coated pipeline is protected by the guard of my invention, which guard is interposed between the coating and supporting wood skids; and Fig. 3 is a cross-sectional view of pipe loaded on the bolster of a truck showing the use of the guard of my invention.

Referring to the drawings, the numeral 10 indicates the guard of my invention, which may be constructed from hard tempered, high carbon, cold rolled strip or sheet steel or other suitable material, that is, material which has in suitable combination both rigidity and flexibility and which is a semi-tubular section, that is, longitudinally open, with a principal radius equal to that of the coated pipe, which it is adapted to protect, but preferably with the upper portion 11 formed on a slightly diminished radius with respect to the radius of said coated pipe.

As shown in Fig. 3, in order to have the edges of the guard 10 lie in tricuspidal areas between stacked pipe, the guards should encompass more than one-half of the circumference of the coated pipe which it is adapted to protect, and, preferably, approximately two-thirds of the circumference of said pipe.

Another advantage of this construction is that it enables the guard to remain on the coated pipe when the pipe is lifted or when the made-up pipe slides on the skid due to expansion or movement.

The length and thickness of the guard 10 will obviously depend upon the diameter and weight of the pipe with which the guard is used, upon the physical characteristics of the protective covering on said pipe, and upon the distance or span between the adjacent guards. This length is of the order of approximately three times the diameter of the pipe in connection with which the guard is adapted to be used.

The ends 12 and horizontal edges 13 of the guard 10 may be slightly flared, but preferably are rounded or chamfered to prevent sharp edges from injuring the pipe coating and to facilitate removal.

In Fig. 2 the guard 10 is shown in position about the coated pipe 14, resting on the skids 15 which are set across the trench 16. The cross skids 17 are employed to support the pipeline which is partially laid and partially supported above the ground level.

In Fig. 3 the guard 10 is shown in various positions about the stacked coated pipes 20 to protect the coating from deformation or abrasion during transit at the bolster 21 and where the cinching chain 22 bears against the coating.

From the foregoing description taken in connection with the accompanying drawings, the uses, advantages, and operation of the guard of my invention will be readily understood by those skilled in the art to which the invention appertains. While I have described the form of my invention which I now consider to be the best embodiment thereof, I desire to have it understood that the article shown is merely illustrative and that the invention is not to be limited to the details disclosed herein, but is to be accorded the full scope of the appended claim.

I claim:

A guard for protecting externally coated pipe, comprising a generally tubular sheet metal section, having an opening along its length defined by generally parallel longitudinally extending edges, the radius of curvature of those portions of the section adjacent each longitudinally extending edge being less than the principal radius of curvature of the remainder of the section, the circumferential length of said section being equal to approximately two-thirds of the circumference of a circle having a radius equal to said principal radius of curvature; the end edges and said longitudinally extending edges being chamfered from the inner surface of the section to facilitate removal of the section from a pipe.

GORDON N. SCOTT.

REFERENCES CITED

The following references are of record in the file of this patent:

UNITED STATES PATENTS

| Number | Name | Date |
| --- | --- | --- |
| 1,003,108 | Hinrichs | Sept. 12, 1911 |
| 1,435,311 | Knight | Nov. 14, 1922 |
| 1,493,245 | Clark | May 6, 1924 |
| 2,197,409 | Jackson | Apr. 16, 1940 |
| 2,408,253 | Diebald | Sept. 24, 1946 |
| 2,441,321 | Ingalls | May 11, 1948 |